Dec. 8, 1925.  
J. R. KILMARTIN  
SCRAPING TOOL  
Filed Dec. 27, 1924  
1,564,247
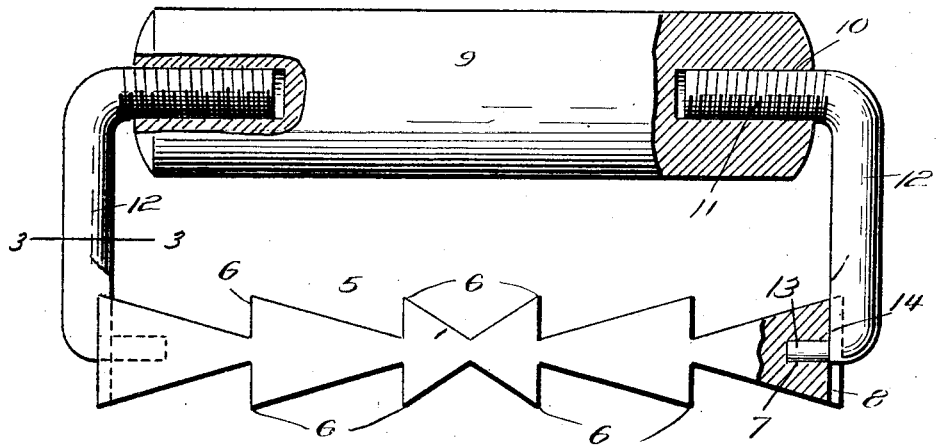
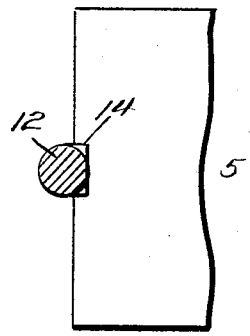
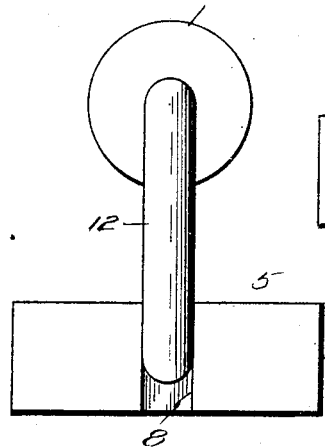
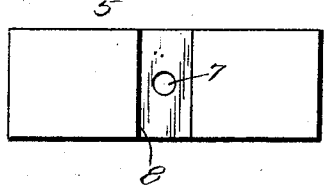
Inventor  
J. R. Kilmartin  
By Clarence A. O'Brien  
Attorney Patented Dec. 8, 1925.

1,564,247

UNITED STATES PATENT OFFICE.

JAMES R. KILMARTIN, OF WASHINGTON, DISTRICT OF COLUMBIA, ASSIGNOR OF ONE-HALF TO PATRICK HARVEY, OF WASHINGTON, DISTRICT OF COLUMBIA.

SCRAPING TOOL.

Application filed December 27, 1924. Serial No. 758,413.

To all whom it may concern:

Be it known that I, JAMES R. KILMARTIN, a citizen of the United States, residing at Washington, in the District of Columbia, have invented certain new and useful Improvements in Scraping Tools, of which the following is a specification.

This invention relates generally to the art of scraping or cleaning, and has more particular reference to a hand tool primarily adapted for the removing of rust scale, dirt or the like, from steel or other metal plate and surfaces, the invention being also useful in the removing of paint, scum, etc., from all surfaces, and particularly from walls, ceilings, floors, roofs and the like of buildings.

The primary object of my invention resides in the provision of a tool of the above character, wherein surfaces may be scraped in a quick and easy manner, the invention being particularly characterized by the arrangement of its cutting edges, wherein the tool functions during reverse movement across the surface being cleaned.

A further object of the invention resides in the provision of a tool, wherein the cutting member is formed with cutting teeth upon opposite sides thereof for obviously permitting the cutting member to be reversed, whenever the cutting edges of one side become worn.

A still further object resides in the provision of a tool of the foregoing character, wherein the cutting member per se may be quickly removed from its carrying handle, in order that a new cutting blade may be associated with the cutting handle.

A further and important object is to provide a tool that may be manufactured and marketed at relatively small cost, and one that is well adapted for the purposes heretofore designated.

With the foregoing and other objects in view, as the nature of the invention will be better understood, the same comprises the novel form, combination, and arrangement of parts, hereinafter more fully described, shown in the accompanying drawing, and claimed.

In the drawing, wherein like characters indicate corresponding parts throughout the several views:

Figure 1 is a side elevational view, partly in cross section, of a scraping tool constructed in accordance with the present invention.

Figure 2 is an end elevational view of the present tool.

Figure 3 is a fragmentary detail longitudinal section taken substantially upon the line 3—3 of Figure 1, and Figure 4 is an end elevational view of the scraping or cutting member per se.

Now having particular reference to the drawing, my novel scraping tool embodies the provision of a scraping or cutting blade 5, of desired length and width, and being of a relatively flat nature as clearly shown in Figures 1, 2, and 4.

Upon opposite surfaces of the blade 5, the same is formed with spaced teeth for producing cutting or scraping edges 6, it being noted that the scraping or cutting edges upon each surface of the blade extend in opposite directions from the center point of the blade, whereby movements of the blade in reverse directions upon the surface to be cleaned or scraped will effect the scraping or cutting operation.

Upon opposite ends of the blade 5, the same is formed with longitudinally extending sockets 7, at the open ends of which are cross channels 8, for a purpose to be hereinafter more fully described.

The handle structure for the blade 5 constitutes the provision of a solid cylindrical shaped handle member 9, the opposite ends of which are formed with screw threaded sockets 10, within which are arranged the right angularly bent screw threaded ends 11 of rods or bolts 12, the lower ends of which are formed with inwardly extending lateral pintles 13, for engagement within the sockets 7, upon the opposite ends of the blade 5. At the lower ends of these rods or bolts 12 and at their inner sides, the same are formed with plane portions 14, that engage within the channels at the opposite ends of the blade for obviously preventing any swinging movement of the rods or bolts with respect to the blades, when said rods or bolts are brought into firm contact with the opposite ends of the blade due to the turning movement of the handle 9, which draws the threaded ends 11 of said rods or bolts into the sockets 10, it being obvious that the directions of the threads at opposite ends of the handle structure are reversed.

It will thus be seen that when the cutting edges of one surface of the blade have become worn, the rods or bolts 12 of the handle structure may be loosened, after which the blade may be turned over and the handle member 9, rotated, in a certain direction, for tightening the members 12 with respect to the blade 5.

It will also be seen that as the blade is moved in opposite directions over the surface to be cleaned, the material upon the surface will be thoroughly scraped therefrom, and this without requiring any great skill or labor upon the part of the operator.

Minor changes may be made in the invention, without departing from the spirit and scope of the appended claims.

Having thus described my invention, what I claim as new and desire to secure by Letters Patent is:

1. A scraping tool of the class described comprising a block-like body provided with a plurality of transversely extending longitudinally spaced cutting edges on its top and bottom, a handle, and connecting members detachably connected with the opposite ends of the handle and the opposite ends of said body for permitting said body to be reversed to dispose the cutting edges of either the top or bottom for use.

2. A scraping tool of the class described comprising a block-like body provided on its top and bottom sides with a plurality of transversely extending longitudinally spaced cutting edges, said body being formed in its opposite ends with sockets and with vertical grooves with which said sockets communicate, a cylindrical hand grip provided in its opposite ends with screw-threaded sockets, and connections between said handle and body, said connections having inturned lower ends extending into said first named sockets and having inturned upper ends, said upper ends being screw-threaded and tapped into the screw-threaded sockets in the handle.

In testimony whereof I affix my signature.

JAMES R. KILMARTIN.